Oct. 29, 1940.  M. S. JACOBSON  2,219,558
CULINARY TONGS
Filed June 24, 1940
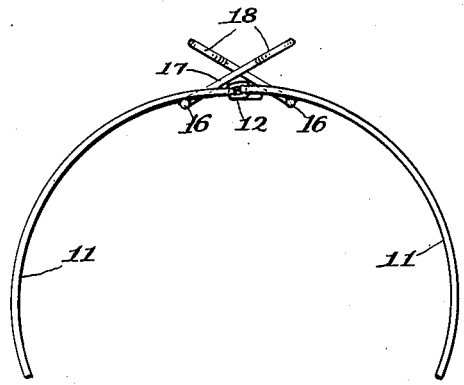
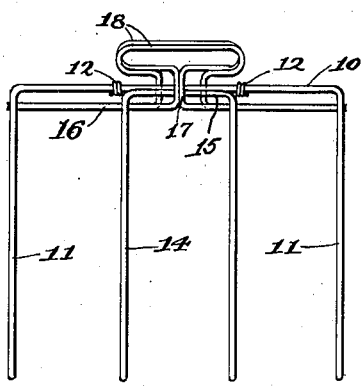
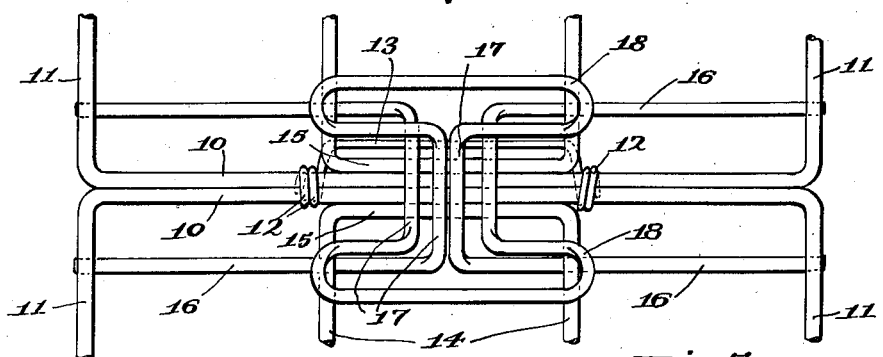
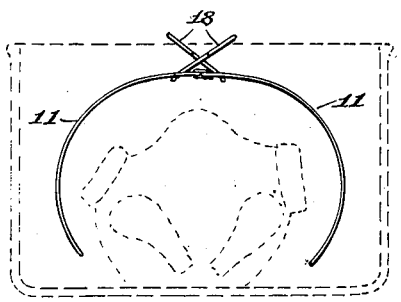
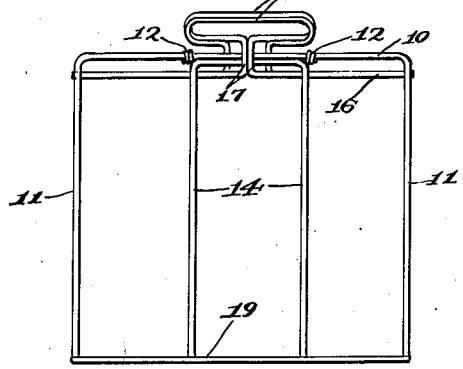
Inventor.
Madge S. Jacobson.
by Martin P. Smith
Attorney.

Patented Oct. 29, 1940

2,219,558

UNITED STATES PATENT OFFICE 2,219,558

CULINARY TONGS

Madge S. Jacobson, Los Angeles, Calif.

Application June 24, 1940, Serial No. 342,085

5 Claims. (Cl. 294—118)

My invention relates to culinary utensils and more particularly to a pair of tongs especially designed for engaging and lifting comparatively large and heavy pieces of meat and fowl while the same are being placed in or removed from a roasting pan or like container, and for lifting and turning the meat or fowl while the same is being baked or roasted.

My present invention is an improvement on the culinary tongs forming the subject matter of my copending abandoned application filed July 16, 1938, Serial No. 219,571.

The principal objects of my present invention are, to generally improve upon, simplify and strengthen the construction of the culinary tongs disclosed in my aforesaid application for patent and to provide a device having a plurality of curved tines or fingers that are adapted to engage large pieces of meat or fowl while the same are being roasted or baked, further, to provide culinary tongs of the character referred to having reinforcing means arranged between the handles and the tines or fingers and further, to provide a form of tongs wherein the free ends of each set of tines or fingers are connected by rods so as to prevent the meat or fowl that is being cooked from being punctured or broken by the tines or fingers while the tongs are in use.

With the foregoing and other objects in view, my invention consists in certain novel features of construction and arrangement of parts that will be hereinafter more fully described and claimed and illustrated in the accompanying drawing in which:

Fig. 1 is an end elevational view of the tongs, the same being in open position.

Fig. 2 is a side elevational view of the tongs.

Fig. 3 is an enlarged plan view of the connected portions of the two parts of the tongs with their handles and showing the reinforcing means between said handles and the tines or fingers.

Fig. 4 is an elevational view of the tongs with dotted lines showing a cooking utensil and a fowl that is being cooked therein.

Fig. 5 is a side elevational view of a modified form of the tongs.

Referring by numerals to the accompanying drawing which illustrates a preferred embodiment of my invention, 10, 10 designate the straight intermediate portions of wire and projecting at right angles from the ends of these straight intermediate portions are curved tines or fingers 11. The straight intermediate members 10 are maintained in hinged relation by the coiled end portions 12 of a straight section of wire 13 that occupies a position parallel with the intermediate portions of the straight members 10.

Arranged between each pair of tines 11 are the spaced members of a pair of tines or fingers 14 formed of wire and curved to correspond with the tines 11 and the inner ends of these tines 14 are connected by a short straight section of wire 15 that occupies a position immediately adjacent and parallel with that portion of the straight member 10 that lies between the coils 12. Thus each jaw or member of the tongs includes four practically identical curved tines or fingers.

Arranged beneath the four fingers of each member of the tongs and disposed a short distance outwardly from and parallel with the straight wire member are straight members 16 of wire that are rigidly secured, preferably by spot welding to the tines or fingers 11 and 14. The intermediate portions of the wires having the straight end portions 16 are extended at right angles to said straight portions toward and across each other as designated by 17 and the intermediate portions of the wire from which these crossed members and the straight end members 16 are formed, are shaped to form looped portions 18 that lie parallel with the straight wire portions 10 and 16, thereby providing handles that may be readily engaged for manipulating the tongs.

The straight crossed portions 17 of the handles are rigidly secured respectively, preferably by spot welding, to the straight portions of wire 15 that connect the inner portions of the inner curved tines or fingers 14. The straight portions 17 of one handle are spaced a sufficient distance apart to receive between them the straight members of the other handle and thus the looped portions 18 may be conveniently engaged to open and close the two sets of curved fingers or tines while a roast or fowl is being lifted into and out of a cooking utensil or while being turned within said utensil.

In Fig. 5, I have shown a modified construction wherein the free ends of the tines or fingers 11 and 14 are connected by straight wires 19 and where such construction is employed, it is impossible to puncture or tear a roast or fowl while the same is being handled by the tongs.

A particularly advantageous feature of my invention is the reinforcing and strengthening of those portions of the tongs that are hinged to each other and which reinforcement is provided by permanently connecting by spot welding or otherwise, the laterally projecting members 16 of the wires that form the handles to the upper and adjacent portions of all of the tines or fingers.

In the manipulation of the tongs, the operator's hands engage the looped portions 18 of the handles and by moving said handles away from each other the free ends of the two sets of tines will be spread apart a sufficient distance to permit the tongs to engage a large piece of meat or fowl, and by moving the handles toward each other the meat or fowl will be grasped between the two sets of tines and when so positioned the roast may be lifted and positioned within or removed from the pan in which it is being cooked and by proper manipulation of the tongs, the meat or fowl may be turned over in order to position same so as to bring about a uniform application of the heat during the roasting or baking function.

Thus it will be seen that I have provided culinary tongs that are relatively simple in construction, inexpensive of manufacture and very effective in performing the functions for which they are intended.

It will be understood that minor changes in the size, form and construction of the various parts of my improved culinary tongs, may be made and substituted for those herein shown and described, without departing from the spirit of my invention, the scope of which is set forth in the appended claims.

I claim as my invention:

1. Culinary tongs comprising a pair of straight rods, means providing a hinge between said rods, curved tines projecting from the ends of said rods, a pair of short rods disposed adjacent the intermediate portions of the first mentioned rods, curved tines projecting from the ends of said short rods and a pair of crossed handles having extended end portions rigidly fixed to the curved tines adjacent the straight rods from which said tines project.

2. Culinary tongs as set forth in claim 1 and with straight rods connecting the free ends of both sets of curved tines.

3. Culinary tongs comprising a pair of straight rods, means providing a hinge between said rods, curved tines projecting from the ends of said rods, a pair of short rods disposed adjacent the intermediate portions of the first mentioned rods, curved tines projecting from the ends of said short rods, rods rigidly secured to the curved tines adjacent the straight rods from which said tones project and handles formed integral with and projecting from the rods that are connected to the tines, the outer portions of the handles being shaped to form loops.

4. Culinary tongs as set forth in claim 3, with rods permanently secured to the free ends of the tines.

5. Culinary tongs comprising a pair of straight rods, means providing a hinge between said rods, curved tines projecting from the ends of said rods, a pair of short rods disposed adjacent and parallel with the intermediate portions of the first mentioned rods, curved tines projecting from the ends of said short rods and crossed handles rigidly secured to said tines adjacent said straight rods.

MADGE S. JACOBSON.